United States Patent
Lada, Jr. et al.

(10) Patent No.: US 9,753,499 B2
(45) Date of Patent: Sep. 5, 2017

(54) METHOD AND SYSTEM FOR LOCATING A NOTEBOOK COMPUTER

(71) Applicant: Hewlett-Packard Development Company, L.P., Houston, TX (US)

(72) Inventors: Henry F. Lada, Jr., Cypress, TX (US); Lee W. Atkinson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 14/507,137

(22) Filed: Oct. 6, 2014

(65) Prior Publication Data
US 2015/0026830 A1 Jan. 22, 2015

Related U.S. Application Data

(63) Continuation of application No. 13/259,517, filed as application No. PCT/US2009/052461 on Jul. 31, 2009, now Pat. No. 8,855,667.

(51) Int. Cl.
| | | |
|---|---|---|
| H04W 24/00 | (2009.01) | |
| G06F 1/16 | (2006.01) | |
| H04L 12/66 | (2006.01) | |
| G06F 21/88 | (2013.01) | |

(Continued)

(52) U.S. Cl.
CPC .......... *G06F 1/1684* (2013.01); *G06F 1/1616* (2013.01); *G06F 1/1677* (2013.01); *G06F 1/1698* (2013.01); *G06F 21/88* (2013.01); *H04L 12/66* (2013.01); *H04W 12/06* (2013.01); *H04W 64/00* (2013.01)

(58) Field of Classification Search
CPC ..... H04W 76/007; H04W 64/00; H04W 4/02; H04W 48/04; H04W 52/02; H04W 52/0216; H04W 52/0245; H04W 80/04; H04M 1/0214; H04M 1/0237; H04L 2012/5607; G08B 25/10; G08B 13/1427; G01F 23/241
USPC .... 455/404.1, 456.1–457, 575.1–575.4, 574, 455/343.2–343.5; 370/310.2, 328; 340/539.17, 568.1; 342/357.2, 450
See application file for complete search history.

(56) References Cited

U.S. PATENT DOCUMENTS

| | | | |
|---|---|---|---|
| 5,936,526 A | | 8/1999 | Klein |
| 6,112,054 A | * | 8/2000 | Kita .............................. 455/12.1 |

(Continued)

FOREIGN PATENT DOCUMENTS

| | | |
|---|---|---|
| CN | 101170420 | 4/2008 |
| CN | 101382431 A | 3/2009 |

(Continued)

OTHER PUBLICATIONS

Examination Report Under Section 18 (3) received in related GB Application No. 1201223.3, mailed Sep. 20, 2013 5 pp.

(Continued)

*Primary Examiner* — Steve D Agosta
(74) *Attorney, Agent, or Firm* — Michael A. Dryja

(57) ABSTRACT

A method for locating a notebook computer by sending a Wake on Wireless WAN (WoW) signal via a wireless network to the notebook computer to switch ON the notebook computer; instructing the notebook computer to determine its own location using GPS if the notebook computer lid is open.

5 Claims, 6 Drawing Sheets

(51) Int. Cl.
  *H04W 12/06* (2009.01)
  *H04W 64/00* (2009.01)

(56) References Cited

U.S. PATENT DOCUMENTS

| | | | |
|---|---|---|---|
| 6,294,995 B1* | 9/2001 | Patterson | G06F 1/1616 340/568.1 |
| 6,362,736 B1 | 3/2002 | Gehlot | |
| 6,510,380 B1 | 1/2003 | Curatolo et al. | |
| 7,477,906 B2 | 1/2009 | Radic et al. | |
| 7,505,799 B2* | 3/2009 | Suzuki et al. | 455/575.3 |
| 7,925,298 B2* | 4/2011 | Chen | G06F 1/1616 345/169 |
| 8,023,262 B2* | 9/2011 | Ligtenberg | G06F 1/1616 345/157 |
| 8,169,939 B2 | 5/2012 | He et al. | |
| 2002/0034953 A1 | 3/2002 | Tricarico | |
| 2003/0117316 A1 | 6/2003 | Tischer | |
| 2005/0020325 A1* | 1/2005 | Enger | G06F 1/1616 455/575.3 |
| 2005/0149752 A1 | 7/2005 | Johnson | |
| 2005/0192721 A1* | 9/2005 | Jouppi | G05D 1/0011 701/24 |
| 2005/0192741 A1 | 9/2005 | Nichols | |
| 2006/0145839 A1 | 7/2006 | Sandage | |
| 2006/0270420 A1 | 11/2006 | Brock | |
| 2008/0004039 A1 | 1/2008 | Ober | |
| 2009/0003292 A1 | 1/2009 | Waltermann | |
| 2009/0098889 A1 | 4/2009 | Barcklay | |
| 2009/0144574 A1 | 6/2009 | Tseng | |
| 2009/0149192 A1 | 6/2009 | Vargas | |
| 2009/0172163 A1 | 7/2009 | Carroll | |
| 2009/0197652 A1 | 8/2009 | Lundstrom | |
| 2010/0062788 A1 | 3/2010 | Nagorniak | |
| 2010/0151846 A1* | 6/2010 | Vuong | H04M 1/0245 455/418 |
| 2013/0102268 A1* | 4/2013 | Wang | G01S 19/34 455/343.2 |

FOREIGN PATENT DOCUMENTS

| | | |
|---|---|---|
| CN | 101479703 A | 7/2009 |
| WO | 2006/105562 A2 | 10/2006 |

OTHER PUBLICATIONS

International Searching Authority, International Search Report and Written Opinion, Appln No. PCT/US2009/052461, date of mailing Mar. 23, 2010, 10 pp.

* cited by examiner

METHOD AND SYSTEM FOR LOCATING A NOTEBOOK COMPUTER

RELATED APPLICATIONS

The present patent application is a continuation of the presently pending patent application filed on Sep. 23, 2011, having application Ser. No. 13/259,517, which itself is a national stage filing under 35 USC 371 claiming priority to the PCT patent application filed on Jul. 31, 2009, and having international application number PCT/US09/52461.

BACKGROUND

With the pervasive use of portable computing devices, commonly referred to as notebooks or laptops, there is also an increasing trend of loss of such portable computing devices. Such loss have been attributed to both user carelessness as well as theft.

As part of measures to prevent the loss of such notebook computers, technological measures have been built into these notebook computers to ensure ease of tracking to facilitate retrieval. The first step in attempting to retrieve such a notebook computer is to determine its current location.

Presently, notebook computers have been provided with several means of ascertaining their own location. One of the most popular means is by way of a Global Positioning System (GPS). Other known methods are by triangulation using cellular networks, or wireless access points and Assisted GPS which combines cellular networks with conventional GPS.

Notebook computers with built in GPS modules are able to ascertain their location as long as they are able to communicate with orbiting satellites of the GPS systems.

Using GPS to track such notebook computers invariably consumes large amounts of power from the notebook computer batteries when the GPS modules are in continual communication with the satellites. Continual tracking and location determining using GPS can easily deplete the batteries. Continued unsuccessful attempts to determine location via GPS can similarly deplete the power in the batteries and reduces the possibilities of further attempts to track the notebook with other forms of technologies.

BRIEF DESCRIPTION OF THE DRAWINGS

For a detailed description of embodiments of the invention, reference will now be made to the accompanying drawings in which.

DETAILED DESCRIPTION

Wireless Wide Area Network (WWAN) provides wireless connectivity to the internet achieved through the use of telecommunication cellular technology. A computer adapted with a wireless network hardware would be able to wirelessly connect to a network or to the internet using cellular technology.

Wake on WWAN (WoW) is now fast becoming an effective way to wirelessly establish contact with a remote computer and to remotely instruct the computer to perform certain actions. Current accepted protocols of initiating a command signal to such WoW enabled computers are by way of Short Messaging Services (SMS). A specific SMS command containing a predetermined sequence of signals is sent to the WoW enabled computer. The WoW enabled computer receiving such an SMS command would in accordance with predetermined instructions, perform such instructions notably that of waking up or switching On the WoW enabled computer. The SMS command may be sent by a user desiring to locate the computer or by a system as part of its standard procedures to ensure all assets are being tracked.

Once the computer is switched ON, other instructions may be sent via SMS to instruct the computer to perform other actions an example of which is to instruct the computer to send a reply back to the user informing the user of a list of last known GPS locations of the computer. In accordance with a current embodiment, an SMS command may be sent to remotely switch ON the computer, following which another SMS command may be sent to instruct the computer to activate its built in GPS module and determine its own location via the GPS module. Alternatively, the SMS command may further be a combined command providing multiple instructions in addition to the WAKE command.

Figure 1:
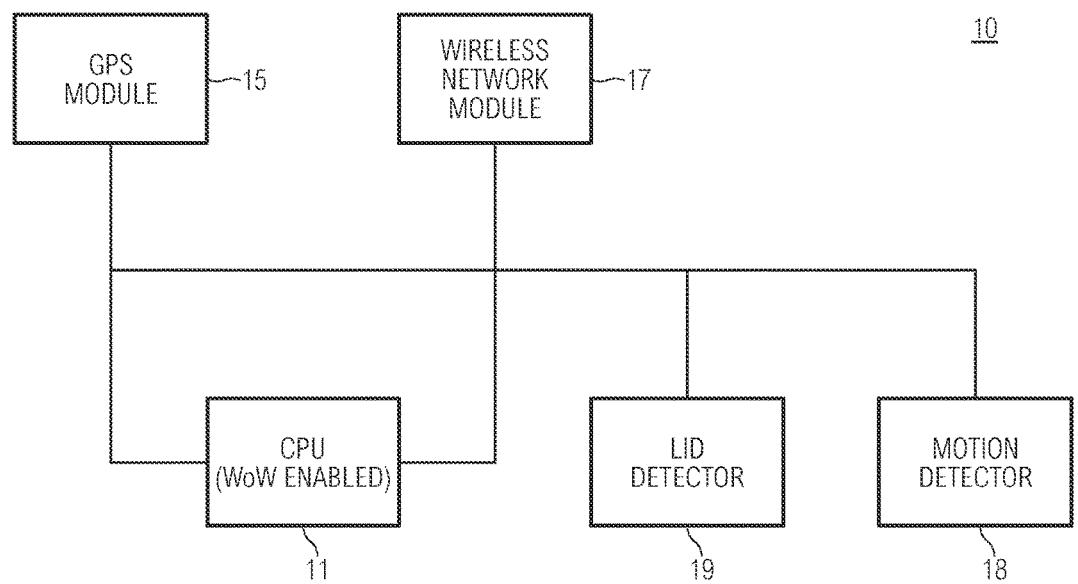
FIG. 1 is a block diagram showing the system for locating a notebook computer in accordance with an embodiment.
Figure 2:
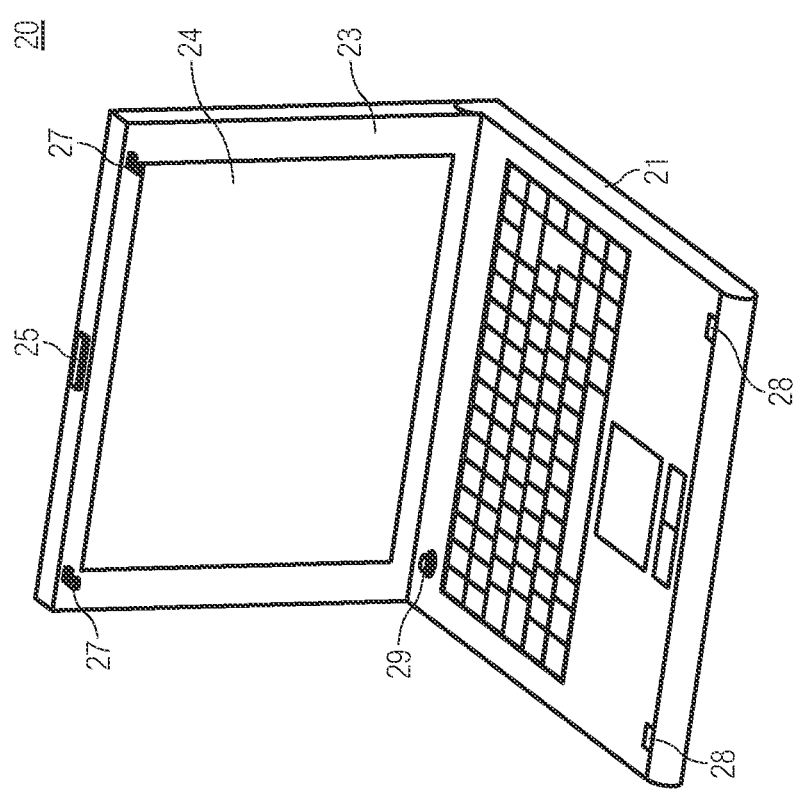
FIG. 2 shows a notebook computer of FIG. 1.

However, a built in GPS module 15 of a notebook computer works well when the notebook computer is in the "open" position. Referring to FIG. 1 and FIG. 2, this "open" position is best characterized by the ready to use position of the notebook computer 20, i.e. when the lid 23 of the notebook computer 20 is lifted away from the body 21 of the notebook computer 20 in a position whereby the screen or monitor 24 in the lid 23 is in an easy to read position by a user. Typically in such a position, the lid 23 would be pointed substantially vertically upwards.

When the lid 24 of the notebook computer 20 is closed, i.e. when the lid 23 and the body 21 are in close proximity and both substantially parallel to each other, the built in GPS module 15 of the notebook computer 20 is often unable to obtain a GPS fix. This may be caused by the proximity of metal components and circuitry in the notebook computer 20 interfering with an antenna of the GPS module.

GPS locators or GPS modules rely on orbiting satellites forming the GPS systems which communicate with the satellites to triangulate the position of the GPS locators or GPS modules. This is often referred to as obtaining a GPS fix. When trying to obtain a GPS fix, GPS locators or GPS modules need to be able to receive RF signals from the orbiting satellites and be able to communicate with at least three such satellites to obtain the GPS fix. When the antenna of the GPS module 15 is in close proximity with other metallic components or other circuitry, communications with the orbiting satellites may be interfered with.

As such, the present embodiment provides for a way to ensure that a GPS fix is attempted when the notebook computer 20 and its lid 23 are in the best position.

Referring to FIG. 1, a system 10 in accordance with the present embodiment is shown. The system 10 may be built into the notebook computer 20 and comprises a motion detector 18, a GPS module 15, a wireless network module 17, and a lid detector 19.

The motion detector 18 built into the notebook computer 20 would serve to detect movement of the notebook computer 20 and be able to ascertain if the notebook computer 20 had substantially moved from one location to another. It may be implemented in several known ways and examples of which are: accelerometers, gyroscopes and triangulation using radio or telecommunication signals.

The GPS module 15 may be a separate card or a circuitry board incorporated into the notebook computer 20. The GPS module 15 would further comprise at least an antenna coupled to the GPS module 15 for communicating with satellites of an external GPS system. The GPS module 15 would by way of the GPS system be able to obtain a fix on its own location and provide this information to the system 10 of the present embodiment.

The wireless network module 17 also comprises at least an antenna coupled to the wireless network module 17. The wireless network module 17 may conform to certain established network protocols examples of which are the UMTS, HSPA, EvDO, LTE or the 802.11 series of wireless communications protocols.

Figure 3:
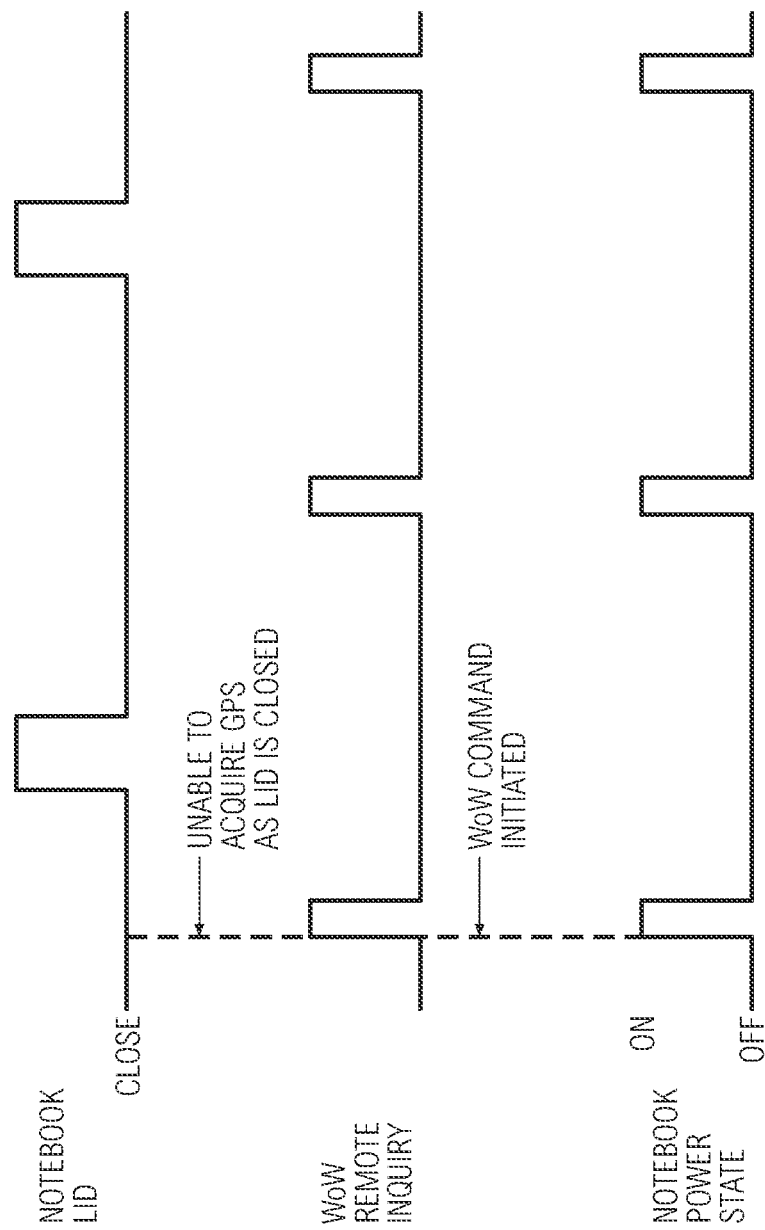
FIG. 3 shows a timing chart of the notebook computer not being able to obtain a GPS location fix
Figure 4:
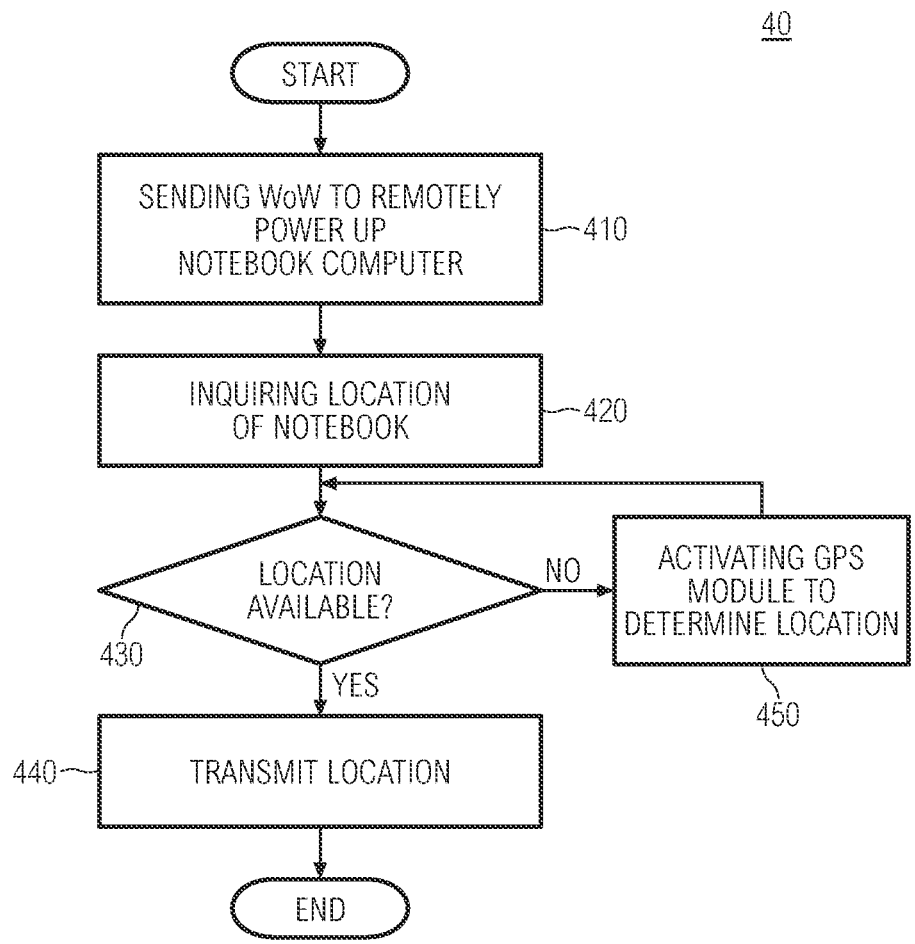
FIG. 4 is a flow chart showing a method for locating a notebook computer.

FIG. 3 and FIG. 4 shows the using of WoW in attempting to determine the location of the notebook computer 20. Referring to FIG. 3, when the lid 23 of the notebook computer 20 is closed, the performance of the GPS module 15 is severely reduced and a GPS fix is not usually possible. A WoW command is sent 410 by the user to remotely power up or switched ON the notebook computer 20, the notebook computer 20 would be powered up or switched ON. Following which an inquiry 420 is made as to the location of the notebook computer 20. If the location is available and known to the notebook computer 20, that location is transmitted 440 to the user. If the location is not known, the GPS module is activated to attempt to determine 450 the location via a GPS fix. However, in the scenario of FIG. 3, the WoW command is sent 410 when the notebook computer is in a physically closed position. Having the notebook computer 20 in a closed position would likely result in the GPS module 15 not being able to obtain a GPS fix and consequently unable to obtain a GPS determined location of the notebook computer 20.

In such a situation whereby the GPS fix cannot be made, present systems would continue to initiate WoW commands to the notebook computer 20 at predetermined time periods to attempt to switch on the notebook computer 20 to obtain a GPS fix. However, if the notebook computer 20 remains closed during the attempts when WoW is initiated, these attempts would primarily result in exhausting the batteries of the notebook computer 20 while unable to retrieve any location information. Eventually, the battery would deplete and the user could no longer locate the notebook via WoW and GPS.

Alternatively, after failure to obtain a GPS fix, instructions could be issued to the notebook computer 20 to automatically wake up or switch ON at regular intervals to attempt a GPS fix. However, this would be a similarly random attempt to wake the notebook computer hoping to coincide with the lid 23 being opened and effectively obtaining a GPS fix. Another way may be to remotely switch ON the notebook computer 20 using the WoW command and keep it ON until the lid 23 is opened to facilitate the GPS fix. However, this would surely be a method which would deplete the batteries in a short span of time.

Figure 5:
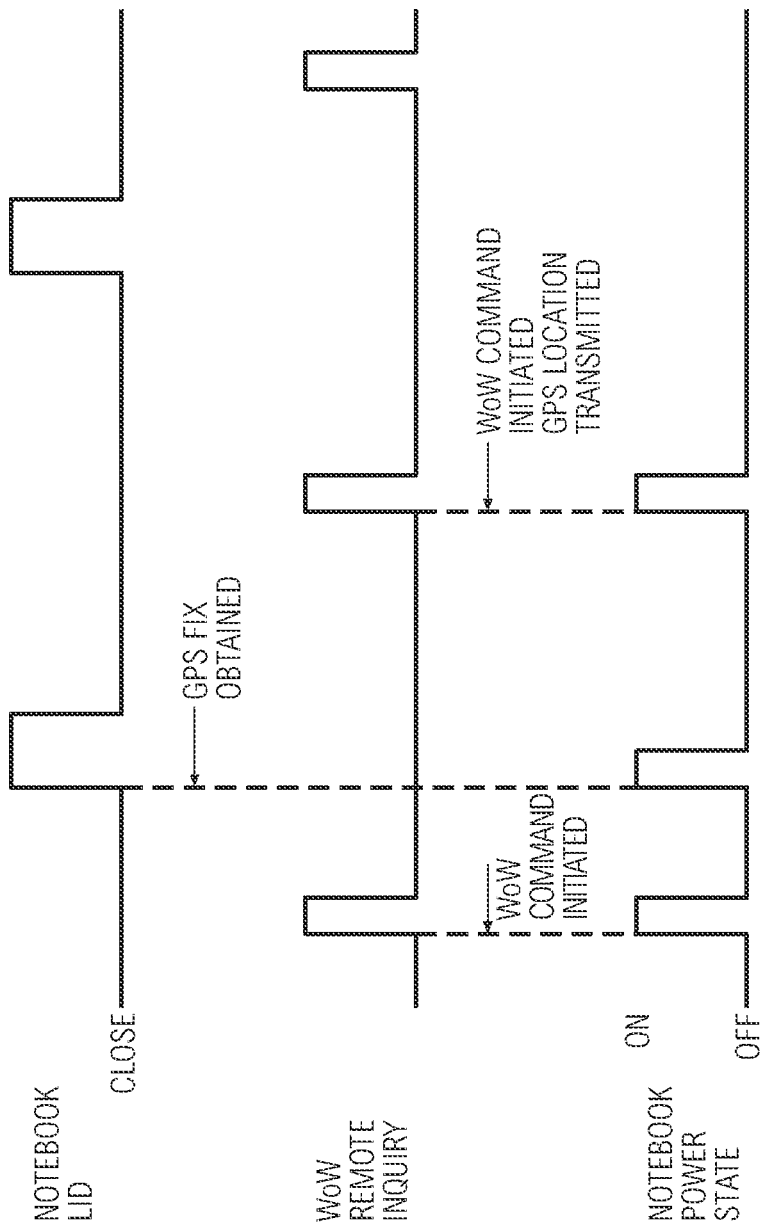
FIG. 5 shows a timing chart of the notebook computer in accordance to an embodiment.
Figure 6:
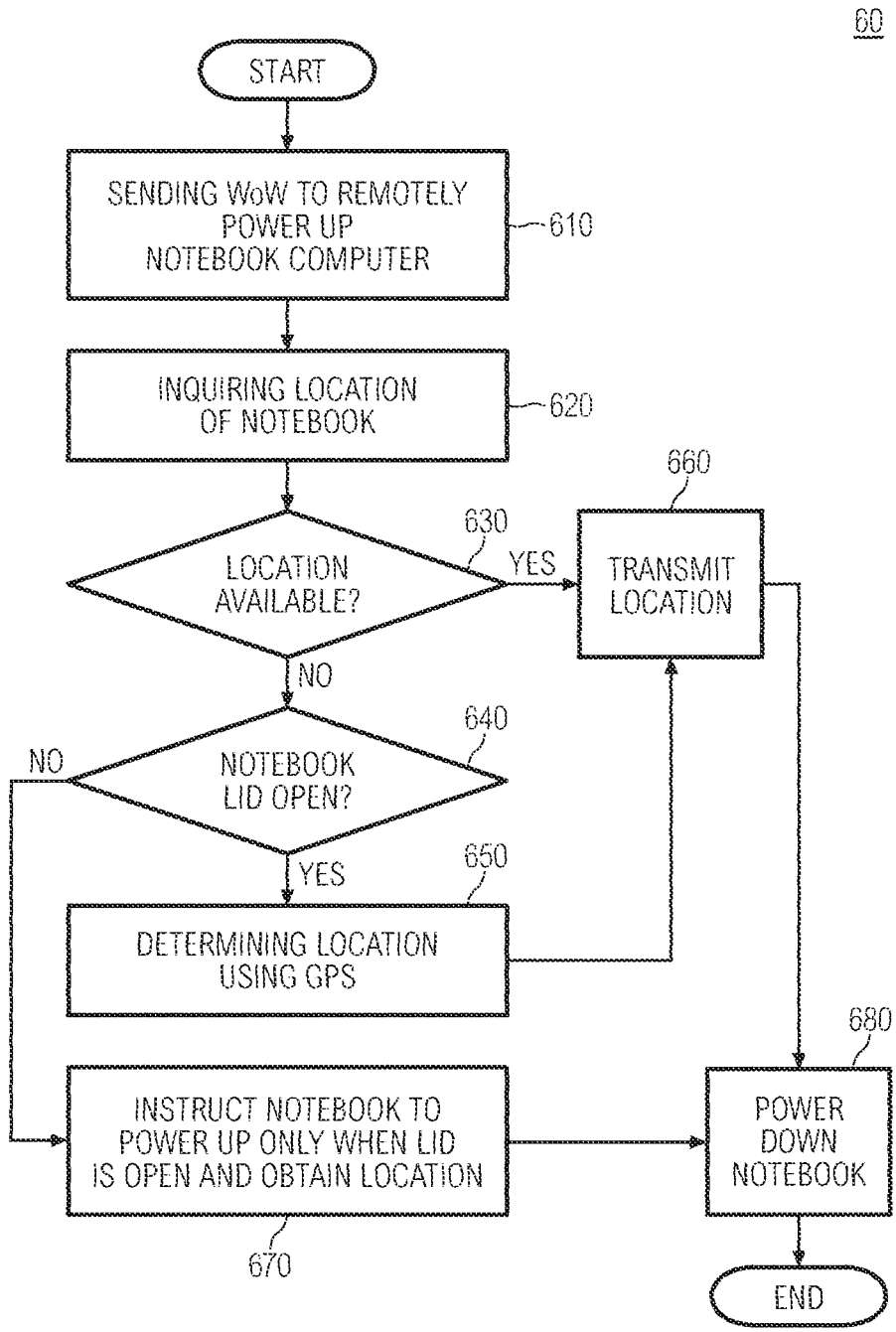
FIG. 6 is a flow chart showing a method in accordance with an embodiment.

Referring to FIG. 5 and FIG. 6, the method 60 in accordance with the present embodiment for locating a notebook computer starts with the sending 610 of a WoW command to remotely switch ON the notebook computer 20 by the user. An inquiry 620 is then sent to ascertain the location of the notebook computer 20. If available, the method 60 proceeds to transmit 660 the location to the user and then following which the notebook computer is switched OFF 680.

If however the location of the notebook computer 20 is not available, a check is performed to ascertain if the lid 23 of the notebook computer 20 is open. If the lid 23 is open, the GPS module 15 of the notebook computer 20 is activated to obtain a GPS fix and consequently determine 650 the location of the notebook computer 20. The method 60 then proceeds to transmitting 660 the GPS determined location back to the user.

If however, the lid 23 of the notebook computer 20 is not open, i.e. closed, instructions are then given to the notebook computer to power up or switch ON itself when the lid 23 is opened and to obtain its own location. The instructions would further comprise activating the GPS module and obtaining a GPS fix and a GPS determined location of the notebook computer. After these instructions had been sent to the notebook computer 20, the notebook computer would shut down or switch OFF automatically to prevent loss of battery power.

In order for the notebook computer to detect that the opening or closing of the lid 23, some form of detection means would be required. The lid detector 19 of the notebook computer 20 would serve to ascertain whether the lid 23 is opened or closed.

Referring to FIG. 2, the lid detector 19 may comprise of a mechanical switch 29 which is depressed when the lid is closed and is released when the lid is open.

The lid detector may further comprise of mechanical switches built into latches 27, 28 of the notebook computer 20 for securing the lid 23 in a closed position. Such mechanical switches would be activated when the lid 23 is closed and provide a signal via the lid detector 23 to the notebook computer that the lid 23 is closed. Other forms of detection such as optical or electromechanical switches may further be used for lid detection.

In another embodiment, the lid detector 19 may further comprise an accelerometer. The accelerometer would be able to detect the positions of the lid 23 and provide an open or close signal depending on the position of the lid relative to the body 21 of the notebook computer 20.

In yet another embodiment, the motion detector 18 built into the notebook computer 20 may be used in conjunction with the method described earlier. The motion detector 18 may be used to determine if the notebook computer 20 has been moved since its last GPS fix. If no further movement is detected by the motion detector 18, there would not be any need to obtain another GPS fix and consequently wasting any battery life. If however, the motion detector 18 detects that the notebook has been moved since the earlier GPS fix, then the location of the notebook computer 20 has changed and an additional GPS fix would be required to obtain the correct location of the notebook computer.

In a further embodiment, the motion detector 18 could be used to further ascertain a current location of the notebook computer 20 after an initial GPS fix has been performed. The initial GPS fix would have obtained the initial location of the notebook computer 20. However, the lid 23 of the notebook computer 20 may be closed thereafter and the notebook computer 20 moved to another location. With the lid 23 closed, the GPS module 15 is prevented from obtaining another GPS fix even though the location of the notebook computer 20 has changed. The motion detector 18 would have detected the movement and be able to ascertain that the location of the notebook computer 20 had changed. The motion detector 18 could then be able to determine the current location of the notebook computer 20 while the lid 23 is closed by detecting and calculating the distance and direction moved from the location of the initial GPS fix. The motion detector 18 may be instructed to at predetermined regular intervals determine the updated locations and store them for future reference.

Referring to FIG. 5, the motion detector 18 determined location of the notebook computer may be transmitted 660 when an inquiry 620 on the location of the notebook computer is made if the initial location has changed or if its not available.

The motion detector 18 may further be instructed to continually track the movement of the notebook computer 20 and continually update and calculate its location in conjunction with any earlier GPS fixes obtained. The motion detector 18 determined locations may be stored in the notebook computer 20 for reference and may be provided in situations when the GPS module 15 is unable to obtain a GPS fix. Alternatively, the motion detector 18 may operate specifically to only detect movement of the notebook computer 20 or be activated only when a request via the WoW method had been initiated.

The motion detector 18 may be implemented in a variety of ways such as using accelerometers, gyroscopes and triangulation using cellular networks, or wireless access points.

In another embodiment, the motion detector 18 and the lid detector 19 may be implemented using a singular module and may make also be implemented using accelerometers, gyroscopes and triangulation using cellular networks, or wireless access points.

Numerous variations and modifications will become apparent to those skilled in the art once the above disclosure is fully appreciated.

What is claimed is:

1. A method comprising:
    in response to a motion detector of a portable computing device detecting that the portable computing device has become stationary after having been moved and that a lid of the portable computing device has been opened, automatically causing, by the portable computing device, a global positioning system (GPS) module of the portable computing device to exit a low-power mode, by applying power to the GPS module, such that the GPS module periodically reports a current location of the portable computing device, to determine a location of the portable computing device;
    after the GPS module has determined the location, responsively causing, by the portable computing device, the GPS module to enter the low-power state without user interaction, by removing the power from the GPS module, such that the GPS module does not periodically report the current location of the portable computing device; and
    in response to the motion detector detecting that the lid of the portable computing device has been opened but that the portable computing device has not been moved, refraining from causing the GPS module to exit the low-power mode to determine the location of the portable computing device,
    wherein the motion detector is active and is powered regardless of whether the lid of the portable computing device is open or closed.

2. The method of claim 1, wherein the motion detector has an ability to detect a distance and a direction in which the portable computing device has moved, and the method further comprises:
    in response to the motion detector of the portable computing device detecting that the portable computing device has moved and that the lid of the portable computing device has been closed, automatically causing, by the portable computing device, the motion detector to detect the distance and the direction in which the portable computing device has moved; and
    after the motion detector has detected the distance and the direction, determining, by the portable computing device, a new location of the portable computing device from the location previously determined by the GPS module and from the distance and the direction detected by the motion detector.

3. A portable computing device comprising:
    a user-closable lid;
    a global positioning system (GPS) module;
    a motion detector to determine whether the portable computing device is being moved or is not being moved; and
    a controller to:
        in response to the motion detector detecting that the portable computing device has become stationary after having been moved and that the lid has been opened, automatically cause the GPS module to exit a low-power mode, by applying power to the GPS module, such that the GPS module periodically reports a current location of the portable computing device, to determine a location of the portable computing device;
        after the GPS module has determined the location, responsively cause the GPS module to enter the low-power state without user interaction, by removing the power from the GPS module, such that the GPS module does not periodically report the current location of the portable computing device;
        in response to the motion detector detecting that the lid of the portable computing device has been opened but that the portable computing device has not been moved, refrain from causing the GPS module to exit the low-power mode to determine the location of the portable computing device,
    wherein the motion detector is active and is powered regardless of whether the lid of the portable computing device is open or closed.

4. The portable computing device of claim 3, wherein the motion detector has an ability to detect a distance and a direction in which the portable computing device has moved, and the controller is further to:
    in response to the motion detector of the portable computing device detecting that the portable computing device has moved and that the lid of the portable computing device has been closed, automatically cause the motion detector to detect the distance and the direction in which the portable computing device has moved; and
    after the motion detector has detected the distance and the direction, determine a new location of the portable computing device from the location previously determined by the GPS module and from the distance and the direction detected by the motion detector.

5. A non-transitory computer-readable data storage medium to store program code executable by a portable computing device to:

in response to a motion detector of the portable computing device detecting that the portable computing device has become stationary after having been moved and that a lid of the portable computing device has been opened, automatically cause a global positioning system (GPS) module of the portable computing device to exit a low-power mode, by applying power to the GPS module, to determine a location of the portable computing device, the motion detection having an ability to detect a distance and a direction in which the portable computing device has moved, the motion detection active and powered regardless of whether the lid of the portable computing device is open or closed;

after the GPS module has determined the location, responsively cause the GPS module to enter the low-power state without user interaction, by removing the power from the GPS module;

in response to the motion detector detecting that the lid of the portable computing device has been opened but that the portable computing device has not been moved, refrain from causing the GPS module to exit the low-power mode to determine the location of the portable computing device;

in response to the motion detector of the portable computing device detecting that the portable computing device has moved and that the lid of the portable computing device has been closed, automatically cause the motion detector to detect the distance and the direction in which the portable computing device has moved; and after the motion detector has detected the distance and the direction, determine a new location of the portable computing device from the location previously determined by the GPS module and from the distance and the direction detected by the motion detector.

* * * * *